United States Patent
Guo et al.

(10) Patent No.: US 10,577,265 B2
(45) Date of Patent: Mar. 3, 2020

(54) METHOD FOR TREATING ELECTROLESS COPPER PLATING WASTEWATER

(71) Applicant: GUANGZHOU ULTRA UNION CHEMICALS LTD, Guangzhou, Guangdong (CN)

(72) Inventors: Chongwu Guo, Guangdong (CN); Fonvoon Lai, Guangdong (CN)

(73) Assignee: GUANGZHOU ULTRA UNION CHEMICALS LTD, Guangzhou (CN)

( * ) Notice: Subject to any disclaimer, the term of this patent is extended or adjusted under 35 U.S.C. 154(b) by 0 days.

(21) Appl. No.: 16/236,327

(22) Filed: Dec. 28, 2018

(65) Prior Publication Data

US 2020/0039852 A1 Feb. 6, 2020

(30) Foreign Application Priority Data

Aug. 2, 2018 (CN) .......................... 2018 1 0870501

(51) Int. Cl.
| | |
|---|---|
| C02F 1/66 | (2006.01) |
| C23C 18/38 | (2006.01) |
| C02F 1/72 | (2006.01) |
| C02F 1/70 | (2006.01) |
| C23C 18/16 | (2006.01) |
| C02F 1/52 | (2006.01) |
| C02F 103/16 | (2006.01) |

(52) U.S. Cl.
CPC .............. C02F 1/66 (2013.01); C02F 1/5236 (2013.01); C02F 1/705 (2013.01); C02F 1/722 (2013.01); C23C 18/1689 (2013.01); C23C 18/38 (2013.01); C02F 2103/16 (2013.01)

(58) Field of Classification Search
None
See application file for complete search history.

(56) References Cited

U.S. PATENT DOCUMENTS

| | | | | |
|---|---|---|---|---|
| 3,816,306 | A * | 6/1974 | Roy | C02F 1/722 210/709 |
| 3,855,141 | A * | 12/1974 | Ruff | C23C 18/38 423/23 |
| 4,419,246 | A * | 12/1983 | Jayawant | C02F 1/5236 210/721 |
| 4,428,840 | A * | 1/1984 | Mudder | C02F 1/5236 210/717 |
| 5,262,063 | A * | 11/1993 | Yen | C02F 9/00 210/724 |
| 5,632,900 | A * | 5/1997 | Jevec | C02F 1/025 210/721 |
| 5,639,347 | A * | 6/1997 | Lindberg | D21C 9/1005 162/29 |
| 6,238,571 | B1 * | 5/2001 | Olmez | C02F 1/5245 210/722 |
| 6,274,045 | B1 * | 8/2001 | Kreisler | C02F 1/54 210/710 |
| 2008/0038169 | A1 * | 2/2008 | Phan | C02F 1/72 423/120 |
| 2015/0345024 | A1 * | 12/2015 | Kanazawa | C23C 18/1617 106/1.23 |

OTHER PUBLICATIONS

Kurniawan et al. (Chemical Engineering Journal, 2006, 118, 83-98). (Year: 2006).*

* cited by examiner

*Primary Examiner* — Clare M Perrin
(74) *Attorney, Agent, or Firm* — Wayne & Ken, LLC; Tony Hom

(57) ABSTRACT

A method for combined treatment of electroless copper plating wastewater includes oxidizing hydroxyl-containing organic amine complexants with hydrogen peroxide or sodium hypochlorite to organic acid complexants containing amine group (or amino group) and carboxyl group, precipitating the carboxyl-containing complexants using synergistic effect of ferrous ions and calcium ions and precipitating the copper ions released from the complexes to copper hydroxide precipitate to effectively removing copper. Using this precipitation method to remove complexants in the electroless copper plating wastewater, the problem in the prior art that it is difficult to destroy the hydroxyl-containing organic amine complexant is solved and the COD in the wastewater is effectively reduced.

10 Claims, No Drawings

METHOD FOR TREATING ELECTROLESS COPPER PLATING WASTEWATER

CROSS-REFERENCE TO RELATED APPLICATIONS

This application claims the benefit of priority from Chinese Application No. 201810870501.3, filed on Aug. 2, 2018. The content of the aforementioned application, including any intervening amendments thereto, is incorporated herein by reference in its entirety.

TECHNICAL FIELD

The present application relates to industrial wastewater treatment, and particularly to a method for treating electroless copper plating wastewater.

BACKGROUND

Electroless copper plating plays an important role in surface treatment, and is mainly applied to a bottom layer in the electroplating of non-metallic materials, metallization of the holes of the printed circuit board, electromagnetic shielding layer of the electronic devices, and etc.

Electroless copper plating now generally uses hydroxyl-containing organic amine as complexants, but such complexants have strong antioxidation, bringing about great difficulty in treating the electroless copper plating wastewater. The copper ions in the wastewater can be removed with a heavy metal trapping agent according to a conventional chemical treatment method, but there is no suitable method to remove the complexants, and due to the presence of the complexants in the wastewater, COD cannot meet the requirements of Emission Standard for Pollutants in Electroplating.

Electroless copper plating often used a salt of carboxyl-containing organic acid as a complexant in the past, such as disodium ethylenediaminetetraacetate and sodium potassium tartrate. However, disodium ethylenediaminetetraacetate has a strong antioxidation and the conventional oxidation method cannot be used to destroy the complexant. Therefore, there are great difficulties in treating the electroless copper plating wastewater that contains such complexant and the treatment results often fail to meet the requirements of Emission Standard for Pollutants in Electroplating.

SUMMARY OF THE PRESENT INVENTION

In view of the above problems, a method for treating electroless copper plating wastewater is provided to achieve an effective treatment of complexants, copper ions, etc. in the electroless copper plating wastewater.

To achieve the above object, the present application provides a method for treating electroless copper plating wastewater includes the following steps:

(1) adjusting the electroless copper plating wastewater to pH of 10-12 under mechanical stirring, and adding an oxidant to oxidize complexants and reductants for 90-240 minutes by controlling ORP value, hydroxyl group of a complexant molecule being oxidized to carboxyl group;

(2) adjusting the wastewater treated in step (1) to pH of 5-8 followed by an addition of a ferrous chloride solution under mechanical stirring;

(3) adjusting the wastewater treated in step (2) to pH of 10-12 with lime milk under mechanical stirring to precipitate the complexants containing carboxylic group using a synergistic effect of ferrous ions and calcium ions and precipitate heavy metal ions including copper ions released from complexes forming hydroxide precipitate;

(4) flocculating the precipitate in the wastewater treated in step (3) with a flocculant under mechanical stirring into particles of large size to settle;

(5) filtering the wastewater treated in step (4) to remove the precipitate; and (6) adjusting the wastewater treated in step (5) to pH of 6-9.

The electroless copper plating wastewater has a weak alkalinity so that the addition of a small amount of alkaline solution can adjust the pH to a range suitable for process.

Under alkaline conditions and the catalytic action of copper ions, the hydroxyl group of the hydroxyl-containing organic amine can be oxidized to a carboxyl group using hydrogen peroxide and/or sodium hypochlorite to form an organic acid complexant containing amine group (or amino group) and carboxyl group.

Under alkaline conditions, the organic acid complexant containing carboxyl group can be effectively removed by forming a precipitate using the synergistic effect of ferrous ions and calcium ions.

While the complexant is precipitated, the copper ions released from the complex are effectively removed by forming a copper hydroxide precipitate.

The wastewater is added with ferrous chloride solution at a pH of 5-8 followed by adjusting the pH to 10-12 with lime milk, which can ensure that the precipitation of ferrous ions with the organic acid complexant containing carboxyl group is prior to that of ferrous ions with hydroxy ions during the increase of pH. In addition, the remaining ferrous ions can be precipitated by forming ferrous hydroxide and the ferrous ions can be completely precipitated when the pH rises to 10-12.

With the catalysis of copper ions, the oxidation method using hydrogen peroxide and sodium hypochlorite can effectively destroy reductant and other organic compounds in the electroless copper plating wastewater to allow the COD (Chemical Oxygen Demand) in the wastewater to meet the requirements of Emission Standard for Pollutants in Electroplating.

After the oxidation reaction is complete, the copper ions can also catalyze the decomposition of hydrogen peroxide and sodium hypochlorite to shorten the decomposition time.

The experimental results have demonstrated that hydrogen peroxide can form a precipitate with calcium ions under alkaline conditions to significantly reduce its oxidizability. Therefore, it is not suitable to adjust pH of the wastewater with calcium hydroxide when hydrogen peroxide is used as an oxidant.

Stirring means, including mechanical stirring and air stirring, are generally adopted in the treatment of the electroplating wastewater. However, the present invention only employs the mechanical stirring, since ferrous ions may be oxidized by air to lose its reducibility under air stirring, and the mechanical stirring can prevent the blowing pipe from being buried and blocked by sand and precipitate during the treatment of wastewater.

In some embodiments, in step (1), the pH of the wastewater is adjusted with a sodium hydroxide solution with a concentration of 50-100 g/L.

In some embodiments, the oxidant in step (1) is a hydrogen peroxide solution at a concentration of 2%-5% by weight or a sodium hypochlorite aqueous solution having active chlorine at a concentration of 1%-5% by weight.

In some embodiments, in step (1), the ORP value is controlled at 300-500 mV with a potentiometer.

In some embodiments, in steps (2) and (6), the pH is adjusted with a dilute hydrochloric acid solution having hydrochloric acid at a concentration of 2%-8% by weight.

In some embodiments, the ferrous chloride solution in step (2) contains ferrous chloride tetrahydrate at a concentration of 150-250 g/L.

In some embodiments, in step (2) a volume ratio of the ferrous chloride solution to the electroless copper plating wastewater is 1-5:100.

In some embodiments, in step (2) a volume ratio of the ferrous chloride solution to the electroless copper plating wastewater is 1.5-3:100.

In some embodiments, the lime milk in step (3) contains calcium oxide at a concentration of 50-100 g/L.

In some embodiments, the flocculant in step (4) is a polyacrylamide (PAM) aqueous solution with a concentration of 3-8 g/L.

Based on the technical solutions as described above, the present invention has the following beneficial effects.

1. The method for treating the electroless copper plating wastewater employs an oxidation reaction to oxidize the hydroxyl-containing organic amine complexant to the carboxyl-containing organic acid complexant, and then uses ferrous chloride and calcium hydroxide to precipitate the carboxyl-containing organic acid complexant in the wastewater using the synergistic effect of ferrous ions and calcium ions, thereby the problem in the prior art that it is difficult to destroy the hydroxyl-containing organic amine complexant is solved and the COD in the wastewater is effectively reduced.

2. The method for treating the electroless copper plating wastewater can precipitate the heavy metal ions such as copper ions released from the complex by forming the corresponding hydroxides after the complexant in the wastewater is precipitated, thereby effectively removing the heavy metal pollutant such as copper and solving the problem in meeting the emission standard when treating the electroless copper plating wastewater using a conventional method.

3. The method for treating the electroless copper plating wastewater can remove the pollutants in the wastewater such as complexants and copper ions with a simple process and a low cost for a better market prospective.

DETAILED DESCRIPTION OF THE PRESENT INVENTION

The present invention will be described with reference to the embodiments for a better understanding. However, the invention may be implemented in various modes and is not limited to the embodiments described herein.

Unless otherwise defined, terminology used herein has the same meaning as commonly understood by those skilled in the art. The terms in the description are used only for illustration of the embodiments and are not intended to limit the invention. The term "and/or" used herein includes any and all combinations of one or more of the related elements.

In the present invention, the electroless copper plating wastewater includes organic amine complexants containing hydroxyl group, and organic acid complexants containing amine group (or a hydroxyl group) and carboxyl group.

The equipments used in the following embodiments of the present invention are conventional equipments.

Equipments: electroless copper plating wastewater regulating tank, primary oxidation tank, secondary oxidation tank, feeding tank, precipitation tank, flocculation tank, inclined-tube sedimentation tank, neutralization tank, and plate and frame filter press.

Materials:

Sodium hydroxide solution at a concentration of 50 g/L;

hydrogen peroxide at a concentration of 3% by weight;

sodium hypochlorite solution having active chlorine at a concentration of 3% by weight;

dilute hydrochloric acid at a concentration of 5% by weight;

ferrous chloride solution, a ferrous chloride tetrahydrate solution of a concentration of 200 g/L;

lime milk having calcium oxide at a concentration of 80 g/L; and flocculant, a polyacrylamide (PAM) aqueous solution at a concentration of 5 g/L.

Example 1 Oxidation of Hydroxyl-Containing Organic Amine Complexant with Hydrogen Peroxide This example provided a method for treating electroless copper plating wastewater containing hydroxyl-containing organic amine complexants using hydrogen peroxide oxidation to treat pollutants in the wastewater such as organic amines, copper ions and reductants. Concentration of the wastewater was 2% of that of electroless copper plating solution and hydrogen peroxide was used to oxidize the hydroxyl-containing organic amine complexants to organic acid complexants containing amine group (or amino group). Hydrogen peroxide used at a less amount can achieve a desirable oxidation effect due to the relatively strong oxidability, but hydrogen peroxide had a slower decomposition rate than sodium hypochlorite so that it cannot be completely decomposed in a limited time.

The Present Example Included the Following Steps:

Step (1) Oxidation of Complexant and Reductant

The electroless copper plating wastewater was delivered from a wastewater regulating tank to a primary oxidation tank. The electroless copper plating wastewater was adjusted to pH of 10-12 with sodium hydroxide under stirring by a mixer. Then hydrogen peroxide was introduced to oxidize complexants, reductants and other organic compounds in the wastewater for 60 min by controlling an ORP value at 450 mV with a potentiometer. Then, the oxidized wastewater flowed from the primary oxidation tank into a secondary oxidation tank for a further oxidation and a decomposition of hydrogen peroxide for 120 minutes.

Step (2) Addition of Ferrous Chloride

The wastewater treated in step (1) flowed from the secondary oxidation tank into a feeding tank. The wastewater treated in step (1) was adjusted to pH of 8 with dilute hydrochloric acid under stirring by a mixer. Subsequently, a ferrous chloride solution was added into the wastewater at an amount of 30 L per ton wastewater and part of the ferrous chloride reduced the remaining hydrogen peroxide in the wastewater to form a ferric hydroxide precipitate.

Step (3) Precipitation of Carboxyl-Containing Organic Acid Complexant and Copper Ions The wastewater treated in step (2) flowed from the feeding tank into a precipitation tank. The wastewater treated in step (2) was adjusted to pH of 10-12 with lime milk under stirring by a mixer. Then ferrous ions and calcium ions formed a precipitate with carboxyl-containing organic acid complexants and metal ions such as copper ions released from complexes formed a hydroxide precipitate.

Step (4) Separation of Precipitate

The wastewater then flowed from the precipitation tank into a flocculation tank. The wastewater was added with a flocculant under stirring by a mixer to flocculate the precipitate until the precipitate was agglomerated into particles of large size. Afterwards, the flocculated wastewater flowed from the flocculation tank into an inclined-tube sedimentation tank and the precipitate settled to the bottom of the inclined-tube sedimentation tank. The precipitate was pumped into a plate and frame filter press using a sludge pump for a pressure filtration to produce a filtrate and a filter residue. The filtrate flowed back to the electroless copper plating wastewater regulating tank and the filter residue was treated by a qualified and professional factory.

Step (5) Neutralization Treatment

The wastewater treated in step (4) flowed from the inclined-tube sedimentation tank into a neutralization tank and was adjusted to pH of 7-8 with dilute hydrochloric acid under stirring.

Step (6) Wastewater Discharge

The electroless copper plating wastewater treated in step (5) was discharged from an outlet of the neutralization tank.

Example 2 Oxidation of Hydroxyl-Containing Organic Amine Complexant with Sodium Hypochlorite This example provided a method for treating electroless copper plating wastewater containing hydroxyl-containing organic amine complexants using sodium hypochlorite oxidation to treat pollutants in the wastewater such as organic amines, copper ions and reductants. Concentration of the wastewater was 2% of that of electroless copper plating solution and sodium hypochlorite was used to oxidize the hydroxyl-containing organic amine complexants to organic acid complexants containing amine group (or amino group). Moreover, sodium hypochlorite can be completely decomposed within a specified time of the process due to a faster decomposition rate.

The Present Example Included the Following Steps:

Step (1) Oxidation of Complexant and Reductant

The electroless copper plating wastewater was delivered from a wastewater regulating tank to a primary oxidation tank, and was adjusted to pH of 10-12 with sodium hydroxide under stirring by a mixer. Then sodium hypochlorite solution was added to oxidize complexants, reductants and other organic compounds in the wastewater for 60 min by controlling an ORP value at 450 mV with a potentiometer. Then, the oxidized wastewater flowed from the primary oxidation tank into a secondary oxidation tank for a further oxidation and a decomposition of sodium hypochlorite for 60 min.

Step (2) Addition of Ferrous Chloride

The wastewater treated in step (1) flowed from the secondary oxidation tank into a feeding tank, and was adjusted to pH of 6 with dilute hydrochloric acid under stirring by a mixer. Subsequently, a ferrous chloride solution was added into the wastewater at an amount of 15 L per ton wastewater.

Step (3) Precipitation of Carboxyl-Containing Organic Acid Complexant and Copper Ion The wastewater treated in step (2) flowed from the feeding tank into a precipitation tank, and was adjusted to pH of 11 with lime milk under stirring by a mixer. Then ferrous ions and calcium ions formed a precipitate with carboxyl-containing organic acid complexants and metal ions such as copper ions released from complexes formed a corresponding hydroxide precipitate.

Step (4) Separation of Precipitate

The wastewater flowed from the precipitation tank into a flocculation tank, and was added with a flocculant under stirring by a mixer to flocculate the precipitate until the precipitate was agglomerated into particles of large size. Afterwards, the flocculated wastewater flowed from the flocculation tank into an inclined-tube sedimentation tank and the precipitate settled to the bottom of the inclined-tube sedimentation tank. The precipitate was pumped into a plate and frame filter press using a sludge pump for a pressure filtration to produce a filtrate and a filter residue. The filtrate flowed back to the electroless copper plating wastewater regulating tank and the filter residue was treated by a qualified and professional factory.

Step (5) Neutralization Treatment

The wastewater treated in step (4) flowed from the inclined-tube sedimentation tank into a neutralization tank, and was adjusted to pH of 7-8 with dilute hydrochloric acid under stirring.

Step (6) Wastewater Discharge

The electroless copper plating wastewater treated in step (5) was discharged from an outlet of the neutralization tank.

Example 3 Treatment of Electroless Copper Plating Wastewater Containing Disodium Ethylenediaminetetraacetate This example provided a method for treating electroless copper plating wastewater containing disodium ethylenediaminetetraacetate complexant to treat pollutants such as disodium ethylenediaminetetraacetate, copper and reductants. Concentration of the wastewater was 2% of that of electroless copper plating solution and sodium hypochlorite was used to oxidize organic compounds in the wastewater such as reductants.

The Present Example Included the Following Steps:

Step (1) Oxidation of Reductant

The electroless copper plating wastewater was delivered from a wastewater regulating tank to a primary oxidation tank, and was adjusted to pH of 10-12 with sodium hydroxide under stirring by a mixer. Then sodium hypochlorite solution was added to oxidize reductants and other organic compounds in the wastewater for 60 min by controlling an ORP value at 300 mV with a potentiometer. Then, the oxidized wastewater flowed from the primary oxidation tank into a secondary oxidation tank for a further oxidation and a decomposition of sodium hypochlorite for 60 min.

Step (2) Addition of Ferrous Chloride

The wastewater treated in step (1) then flowed from the secondary oxidation tank into a feeding tank, and was adjusted to pH of 7 with dilute hydrochloric acid under stirring by a mixer. Subsequently, a ferrous chloride solution was added into the wastewater at an amount of 15 L per ton wastewater.

Step (3) Precipitation of Ethylenediaminetetraacetate and Copper Ion

The wastewater treated with step (2) flowed from the feeding tank into a precipitation tank, and was adjusted to pH of 11 with lime milk under stirring by a mixer. Then ferrous ions and calcium ions formed a precipitate with ethylenediaminetetraacetate and metal ions such as copper ions released from complexes formed a corresponding hydroxide precipitate.

Step (4) Separation of Precipitate

The wastewater flowed from the precipitation tank into a flocculation tank, and was added with a flocculant under stirring by a mixer to flocculate the precipitate until the precipitate was agglomerated into particles of large size. Afterwards, the flocculated wastewater flowed from the flocculation tank into an inclined-tube sedimentation tank and the precipitate settled to the bottom of the inclined-tube sedimentation tank. The precipitate was pumped into a plate and frame filter press using a sludge pump for a pressure filtration to produce a filtrate and a filter residue. The filtrate flowed back to the electroless copper plating wastewater regulating tank and the filter residue was treated by a qualified and professional factory.

Step (5) Neutralization Treatment

The wastewater treated in step (4) flowed from the inclined-tube sedimentation tank into a neutralization tank, and was adjusted to pH of 7-8 with dilute hydrochloric acid under stirring.

Step (6) Wastewater Discharge

The electroless copper plating wastewater treated in step (5) was discharged from an outlet of the neutralization tank.

Experimental Example 1 Synergistic Effect of Ferrous Ions and Calcium Ions

Experiment 1

A solution containing 300 mg/L of copper sulfate pentahydrate and 600 mg/L of nitrilotriacetic acid was prepared. The solution was adjusted to pH of 6 with 50 g/L of sodium hydroxide solution to produce a mixture.

Three portions of the mixture were placed in three beakers separately labeled as Nos. 1, 2 and 3 at 1 L each. 2 g of anhydrous calcium chloride was added to No. 1 beaker and dissolved under stirring to obtain a mixed solution. The mixed solution was adjusted to pH of 11 with lime milk under stirring to produce a suspension. And 30 min later, the suspension was filtered with a quantitative filter paper to obtain a filtrate 1.

15 mL of 200 g/L ferrous chloride tetrahydrate solution was added to No. 2 beaker to obtain a mixed solution. The mixed solution was adjusted to pH of 11 with lime milk under stirring to produce a suspension. And 30 minutes later, the suspension was filtered with a quantitative filter paper to obtain a filtrate 2.

30 mL of 200 g/L ferrous chloride tetrahydrate solution was added to a No. 3 beaker to obtain a mixed solution. The mixed solution was adjusted to pH of 11 with 50 g/L of sodium hydroxide solution under stirring to produce a suspension. And 30 min later, the suspension was filtered with a quantitative filter paper to obtain a filtrate 3.

The copper content in the filtrates was measured using atomic absorption spectrometry, and the results were presented in Table 1. As the results demonstrated, the single use of calcium ions to precipitate the nitrilotriacetic acid complexant and copper ions under alkaline conditions can not remove the copper ions effectively and the single use of ferrous ions to precipitate the nitrilotriacetic acid complexant and copper ions under alkaline conditions also can not remove the copper ions effectively, but the simultaneous use of calcium ions and ferrous ions to precipitate the nitrilotriacetic acid complexant and copper ions under alkaline conditions can achieve the desired effect.

TABLE 1

Results of precipitating nitrilotriacetic acid and copper ions with ferrous ions and calcium ions

| Samples | Amount of ferrous chloride tetrahydrate (g/L) | Amount of calcium chloride (g/L) | Reagent to adjust pH to 11 | Copper ion content after treatment (mg/L) | GB 21900-2008 Standard |
|---|---|---|---|---|---|
| 1 | 0 | 2 | calcium hydroxide | 1.16 | substandard |
| 2 | 3 | 0 | calcium hydroxide | 0.06 | up to standard in Table 3 |
| 3 | 6 | 0 | sodium hydroxide | 3.44 | substandard |

The results revealed a synergistic effect of ferrous ions and calcium ions to precipitate carboxyl-containing organic complexants in the new method of the present invention for treating electroless copper plating wastewater.

Experiment 2

A solution containing 200 mg/L of copper sulfate pentahydrate and 600 mg/L of disodium ethylenediaminetetraacetate was prepared.

Three portions of the solution were placed in three beakers separately labeled as Nos. 1, 2 and 3 at 1 L each. 2 g of anhydrous calcium chloride was added to No. 1 beaker and dissolved under stirring to obtain a mixed solution. The mixed solution was adjusted to pH of 11 with lime milk under stirring to produce a suspension. And 30 min later, the suspension was filtered with a quantitative filter paper to obtain a filtrate 1.

15 mL of 200 g/L ferrous chloride tetrahydrate solution was added to No. 2 beaker to obtain a mixed solution. The mixed solution was adjusted to pH of 11 with lime milk under stirring to produce a suspension. And 30 min later, the suspension was filtered with a quantitative filter paper to obtain a filtrate 2.

30 mL of 200 g/L ferrous chloride tetrahydrate solution was added to No. 3 beaker to obtain a mixed solution. The mixed solution was adjusted to pH of 11 with 50 g/L of sodium hydroxide solution under stirring to produce a suspension. And 30 min later, the suspension was filtered with a quantitative filter paper to obtain a filtrate 3.

The copper and ferrum content in the three filtrates was measured using atomic absorption spectrometry, and the results were presented in Table 2.

TABLE 2

Results of precipitating EDTA-2Na and copper ions with ferrous ions and calcium ions

| Samples | Amount of ferrous chloride tetrahydrate (g/L) | Amount of calcium chloride (g/L) | Reagent to adjust pH to 11 | Copper ion content after treatment (mg/L) | Ferrum content after treatment (mg/L) |
|---|---|---|---|---|---|
| 1 | 0 | 2 | calcium hydroxide | 0.58 | — |
| 2 | 3 | 0 | calcium hydroxide | 0.12 | 0.30 |
| 3 | 6 | 0 | sodium hydroxide | 0.22 | 7.31 |

Under alkaline conditions, the single use of calcium ions to precipitate ethylenediaminetetraacetate cannot achieve a copper content meeting the requirements of Table 2 of GB 21900-2008 standard after treatment and the single use of ferrous ions to precipitate ethylenediaminetetraacetate cannot achieve a ferrum content meeting the requirements of GB 21900-2008 standard after treatment, but the combined use of ferrous ions and calcium ions to precipitate can achieve a copper content and a ferrum content both meeting the requirements of Table 3 of GB 21900-2008 standard after treatment and had a higher removal rate of copper than the single use of ferrous ions.

The results also demonstrated the synergistic effect of ferrous ions and calcium ions to precipitate carboxyl-containing organic complexants in the new method of the present invention for treating electroless copper plating wastewater.

Experimental Example 2 Oxidation of Triethanolamine Complexant

A solution containing 200 mg/L of copper sulfate pentahydrate and 400 mg/L of triethanolamine was prepared. The solution can be used in the determination of a product formed from the oxidation of the triethanolamine complexant.

1 L of the solution was added to a beaker, and the solution was adjusted to pH of 11 with 50 g/L of sodium hydroxide to produce a mixed solution. Then the mixed solution was added with 5 mL of hydrogen peroxide with a mass percent concentration of 30% and stirred uniformly to obtain a test solution. The test solution changed from blue to yellow brown. After a standing for 120 min, it was observed that the test solution turned back to blue and no precipitate was formed in the solution.

200 g/L of ferrous chloride tetrahydrate solution was added to the test solution to reduce the remaining hydrogen peroxide until a green ferrous hydroxide precipitate was observed. The test solution treated with ferrous chloride tetrahydrate was adjusted to pH of 7 with dilute hydrochloric acid to produce a mixture. Afterwards, the mixture was added with 20 mL of ferrous chloride tetrahydrate solution and adjusted to pH of 11 with lime milk to produce a suspension. After a standing for 30 min, the suspension was filtered with a quantitative filter paper to obtain a filtrate.

The concentration of copper in the filtrate was determined to be 0.16 mg/L using atomic absorption spectrometry and the copper concentration after treatment met the requirements of Table 3 of GB 21900-2008 standard.

The results demonstrated that the triethanolamine in the solution can be oxidized to nitrilotriacetic acid with the addition of hydrogen peroxide and the nitrilotriacetic acid cannot be destroyed by hydrogen peroxide due to the strong antioxidant activity, so that no copper hydroxide precipitate formed in the test solution after the oxidation.

Experimental Example 3 Oxidation of N,N,N',N'-tetrakis(1-isopropanyl)ethylenediamine Complexant A solution containing 200 mg/L of copper sulfate pentahydrate and 400 mg/L of N,N,N',N'-tetrakis(1-isopropanyl)ethylenediamine was prepared for the determination of a product formed from the oxidation of N,N,N',N'-tetrakis(1-isopropanyl)ethylenediamine.

Experiment 1

1 L of the solution was added to a beaker and the solution was adjusted to pH of 11 with 50 g/L of sodium hydroxide to produce a mixed solution. Then 5 mL of hydrogen peroxide with a mass percent concentration of 30% was added to the mixed solution to obtain a mixture. The mixture was stirred uniformly to produce a test solution. After a standing for 120 min, the blue color of the test solution became shallow and no copper hydroxide precipitate was observed in the test solution.

200 g/L of ferrous chloride tetrahydrate solution was added into the test solution to reduce the remaining hydrogen peroxide until a green ferrous hydroxide precipitate was observed. The test solution treated with ferrous chloride tetrahydrate was adjusted to pH of 7 with dilute hydrochloric acid to produce a blend. Afterwards, the blend was added with 20 mL of ferrous chloride tetrahydrate solution and adjusted to pH of 11 with lime milk to produce a suspension. After a standing for 30 min, the suspension was filtered with a quantitative filter paper to obtain a filtrate.

The concentration of copper in the filtrate was determined to be 0.18 mg/L using atomic absorption spectrometry and the copper concentration after treatment met the requirements of Table 3 of GB 21900-2008 standard.

The results demonstrated that the N,N,N',N'-tetrakis(1-isopropanyl)ethylenediamine in the solution can be oxidized to ethylenediaminetetraacetate with the addition of hydrogen peroxide and the ethylenediaminetetraacetate cannot be destroyed by hydrogen peroxide due to the strong antioxidant activity, so that no copper hydroxide precipitate formed in the test solution after the oxidation.

Experiment 2

1 L of the solution was added to a beaker, and the solution was adjusted to pH of 11 with 50 g/L of sodium hydroxide to produce a mixed solution. Then the mixed solution was added with 10 mL of sodium hypochlorite solution having active chlorine at a mass percent concentration of 10% and stirred uniformly to obtain a test solution. After a standing for 120 min, no precipitate was observed in the test solution.

2 mL of 200 g/L ferrous chloride tetrahydrate solution was added into the test solution to produce a mixture and only green ferrous chloride precipitate was observed without formation of red ferric hydroxide precipitate, which indicated that the sodium hypochlorite was completely decomposed during the reaction. The mixture was adjusted to pH of 7 with dilute hydrochloric acid followed by adding with 20 mL of the ferrous chloride tetrahydrate solution to produce a blend. Then, the blend was adjusted to pH of 11 with lime milk to produce a suspension. After a standing for 30 min, the suspension was filtered with a quantitative filter paper to obtain a filtrate.

The concentration of copper in the filtrate was determined to be 0.27 mg/L using atomic absorption spectrometry and the copper concentration after treatment also met the requirements of Table 3 of GB 21900-2008 standard. But the sodium hypochlorite had a lower oxidation efficiency to complexants than hydrogen peroxide due to a relatively weaker oxidizability.

Experimental Example 4 Results for Treatment of Electroless Copper Plating Wastewater Experiment 1

10 mL of electroless copper plating wastewater containing hydroxyl-containing organic amine complexant was diluted to 1 L with water to prepare a simulated electroless copper plating wastewater.

The simulated electroless copper plating wastewater was adjusted to pH of 11 with 50 g/L of sodium hydroxide to produce a mixed solution. The mixed solution was added with 40 mL of hydrogen peroxide with a mass percent concentration of 3% to produce a mixture. After a standing for 240 min, 200 g/L of ferrous chloride tetrahydrate solution was added into the mixture to produce a blend until a green ferrous hydroxide precipitate was observed. The blend was adjusted to pH of 7 with dilute hydrochloric acid to obtain a mixed liquid. Then the mixed liquid was added with 20 mL of the ferrous chloride tetrahydrate solution and stirred uniformly followed by adjusting pH to 11 with lime milk to produce a suspension. After a standing for 30 min, the suspension was filtered with a quantitative filter paper to obtain a filtrate 1.

Experiment 2

10 mL of electroless copper plating wastewater containing disodium ethylenediaminetetraacetate complexant was diluted to 1 L with water to prepare a simulated electroless copper plating wastewater.

The simulated electroless copper plating wastewater was adjusted to pH of 11 with 50 g/L of sodium hydroxide to produce a mixed solution. The mixed solution was added with 15 mL of sodium hypochlorite solution having active chlorine at a mass percent concentration of 3% to produce a mixture. After a standing for 120 min, the mixture was adjusted to pH of 7 with dilute hydrochloric acid to produce a blend. The blend was then added with 20 mL of 200 g/L ferrous chloride tetrahydrate solution and stirred uniformly to obtain a mixed liquid. The mixed liquid was adjusted to pH of 11 with lime milk to produce a suspension. After a standing for 30 min, the suspension was filtered with a quantitative filter paper to obtain a filtrate 2.

The copper content and COD in each of the filtrates was measured using atomic absorption spectrometry and potassium dichromate method, respectively. The results were shown in Table 3 and met the requirements of Table 3 of GB 21900-2008 standard.

TABLE 3

Effect of complexant on results for treatment of electroless copper plating

| Items | Complexant contained in the wastewater | | GB 21900-2008 Standard |
|---|---|---|---|
| | Hydroxyl-containing organic amine | EDTA-2Na | |
| $Cu^{2+}$(mg/L) | 0.23 | 0.15 | up to standard of Table 3 |
| COD (mg/L) | 33.26 | 37.26 | up to standard of Table 3 |

The technical features of the above-described embodiments may be combined in any combination. For a concise description, only a part of the possible combinations of the technical features in the above embodiments are described. However, as long as there is no contradiction between the combinations of these technical features, all combinations should be considered to be within the scope of this description.

The above examples merely describe several embodiments of the present invention, and the more specific and detailed description thereof is not intended to limit the scope of the invention. It should be noted that various variations and modifications of the invention made by those skilled in the art without departing from the spirit and scope of the invention should be within the scope of the present invention. Therefore, the scope of the invention is defined by the appended claims.

What is claimed is:

1. A method for treating electroless copper plating wastewater, comprising:
   (1) adjusting the electroless copper plating wastewater to a pH of 10-12 under mechanical stirring, and adding an oxidant to adjust the electroless copper plating wastewater to an ORP value of 300-500 mV to perform an oxidation for 90-240 min;
   (2) adjusting the wastewater treated in step (1) to a pH of 5-8 followed by an addition of a ferrous chloride solution under mechanical stirring;
   (3) adjusting the wastewater treated in step (2) to a pH of 10-12 with lime milk under mechanical stirring to precipitate a complexant containing carboxylic group using a synergistic effect of ferrous ions and calcium ions and precipitate copper ions by forming hydroxide precipitate;
   (4) flocculating the precipitate in the wastewater treated in step (3) with a flocculant under mechanical stirring to settle;
   (5) filtering the wastewater treated in step (4) to remove the flocculated precipitate; and
   (6) adjusting the filtrate obtained in step (5) to a pH of 6-9.

2. The method of claim 1, wherein in step (1) the pH is adjusted with a sodium hydroxide solution having a concentration of 50-100 g/L.

3. The method of claim 1, wherein the oxidant in step (1) is a hydrogen peroxide solution having a mass percentage concentration of 2%-5% or a sodium hypochlorite aqueous solution having 1%-5% by weight of active chlorine.

4. The method of claim 3, wherein the ORP value in step (1) is monitored by a potentiometer.

5. The method of claim 1, wherein in steps (2) and (6) the pH is adjusted with a dilute hydrochloric acid solution having 2%-8% by weight of hydrochloric acid.

6. The method of claim 1, wherein the ferrous chloride solution in step (2) contains 150-250 g/L of ferrous chloride tetrahydrate.

7. The method of claim 6, wherein in step (2) a volume ratio of the ferrous chloride solution to the electroless copper plating wastewater is 1-5:100.

8. The method of claim 7, wherein in step (2) a volume ratio of the ferrous chloride solution to the electroless copper plating wastewater is 1.5-3:100.

9. The method of claim 1, wherein the lime milk in step (3) contains 50-100 g/L of calcium oxide.

10. The method of claim 1, wherein the flocculant in step (4) is a 3-8 g/L polyacrylamide (PAM) aqueous solution.

* * * * *